US008967201B2

(12) United States Patent
McMiles

(10) Patent No.: US 8,967,201 B2
(45) Date of Patent: Mar. 3, 2015

(54) PILOT REGULATOR

(75) Inventor: Barry J McMiles, Houston, TX (US)

(73) Assignee: The Subsea Company, Houston, TX (US)

( * ) Notice: Subject to any disclaimer, the term of this patent is extended or adjusted under 35 U.S.C. 154(b) by 458 days.

(21) Appl. No.: 13/320,068

(22) PCT Filed: Oct. 18, 2011

(86) PCT No.: PCT/US2011/056668

§ 371 (c)(1), (2), (4) Date: Nov. 11, 2011

(87) PCT Pub. No.: WO2012/054453

PCT Pub. Date: Apr. 26, 2012

(65) Prior Publication Data

US 2012/0234416 A1 Sep. 20, 2012

Related U.S. Application Data

(60) Provisional application No. 61/394,811, filed on Oct. 20, 2010.

(51) Int. Cl.
*F16K 11/087* (2006.01)
*F15B 13/043* (2006.01)

(52) U.S. Cl.
CPC .................................. *F15B 13/0435* (2013.01)
USPC ................... 137/625.47; 137/382.5; 251/289; 251/339; 166/341

(58) Field of Classification Search
USPC .................... 137/367, 382.5, 599.08, 625.46, 137/625.47, 874; 251/289, 315.06, 339; 166/341
See application file for complete search history.

(56) References Cited

U.S. PATENT DOCUMENTS

| | | | | |
|---|---|---|---|---|
| 3,058,488 | A * | 10/1962 | Hirst et al. | 137/596 |
| 3,710,859 | A * | 1/1973 | Hanes et al. | 166/339 |
| 3,935,108 | A * | 1/1976 | Forgues | 210/340 |
| 4,036,249 | A * | 7/1977 | Perry et al. | 137/367 |
| 4,681,133 | A * | 7/1987 | Weston | 137/315.18 |
| 8,020,623 | B2 * | 9/2011 | Parks et al. | 166/341 |
| 8,387,702 | B2 * | 3/2013 | Biester | 166/338 |

* cited by examiner

*Primary Examiner* — John Fox

(57) ABSTRACT

A pilot regulator system includes a housing having a fluid inflow port, a ball valve to regulate fluid flow among two fluid outflow ports, two regulator outputs each associated with one of said two fluid outflow ports, and a regulator selection aperture. An extension portion, generally horizontal to the regulator outputs, is connected to the regulator selection aperture, and includes an open end for access to a selection member that can be moved between two positions to select fluid flow to one of two regulator outputs. The extension portion also has a groove and the selection member has an extension extending through the groove so as to be movable by either the extension or the selection member itself. The extension portion has an expansive cross-sectional element to guide a remote vehicle to the selection member for movement thereof.

4 Claims, 7 Drawing Sheets

PILOT REGULATOR

CROSS REFERENCE TO RELATED APPLICATIONS

This application is based on provisional patent application No. 61/394,811 entitled "Pilot Regulator" filed on Oct. 20, 2010, which is hereby incorporated by reference as if fully set forth herein.

BACKGROUND OF THE INVENTION

The present invention relates to regulators and more particularly to a pilot regulator system for use in subsea applications and other desired locations that can select among several regulators.

A regulator as used in subsea applications regulates the pressure of fluid in lines from about 5,000 p.s.i. to 3,000 p.s.i. Pilot regulators employed in subsea applications is are employed to actuate a pilot, which acts in response to a load imposed on a valve. Most often a single pilot control valve is employed to regulate a single pressure, which in turn supplies numerous solenoid valves and functions. This creates a single point failure, which means that, upon failure, the well has to be made safe, i.e., plugged, and the blowout preventer (BOP) or lower marine raise package (LMRP) pulled for repairs. This adds a great amount of added expense for the well.

Thus, there exists a need for a device that can reduce down time in the event of a pilot regulator failure.

BRIEF SUMMARY OF THE INVENTION

The primary advantage of the invention is to provide an improved pilot regulator system that can reduce down time of a subsea well in the event of a regulator failure.

Another advantage of the invention is to provide an improved pilot regulator system including a back-up regulator.

Another advantage of the invention is to provide a pilot regulator system that can be controlled by a remote vehicle.

Another advantage of the invention is to provide an improved pilot regulator system that can remotely select among more than one regulator.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is shown a pilot regulator system having a housing with a fluid inflow port, a valve to regulate fluid flow among a plurality of fluid outflow ports, a plurality of regulator outputs each associated with one of said plurality of fluid outflow ports, and a regulator selection aperture; and an extension connected to said regulator selection aperture, said extension including a selection member that can be moved between a plurality of positions, said selection member operatively connected to said valve to select fluid flow to one of said plurality of regulator outputs.

In accordance with another preferred embodiment of the invention, there is shown a pilot regulator system having a housing with a fluid inflow port, a valve to regulate fluid flow among two fluid outflow ports, two regulator outputs each associated with one of said two fluid outflow ports, and a regulator selection aperture; and an extension portion connected to said regulator selection aperture, said extension portion including a selection member that can be moved between two positions, said selection member operatively connected to said valve to select fluid flow to one of two regulator outputs.

In accordance with another preferred embodiment of the invention, there is shown a pilot regulator system having a housing with a fluid inflow port, a valve to regulate fluid flow among two fluid outflow ports, two regulator outputs each associated with one of said two fluid outflow ports, and a regulator selection aperture; an extension portion connected to said regulator selection aperture, said extension portion including an open end for access to a selection member that can be moved between two positions, said selection member operatively connected to said valve to select fluid flow to one of said two regulator outputs; said extension portion having a slot; said selection member having an extension extending through said slot so as to be movable by either said extension or said selection member itself; and said extension portion having an expansive cross-sectional element to guide a remote vehicle to said selection member for movement thereof.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Figure 1:
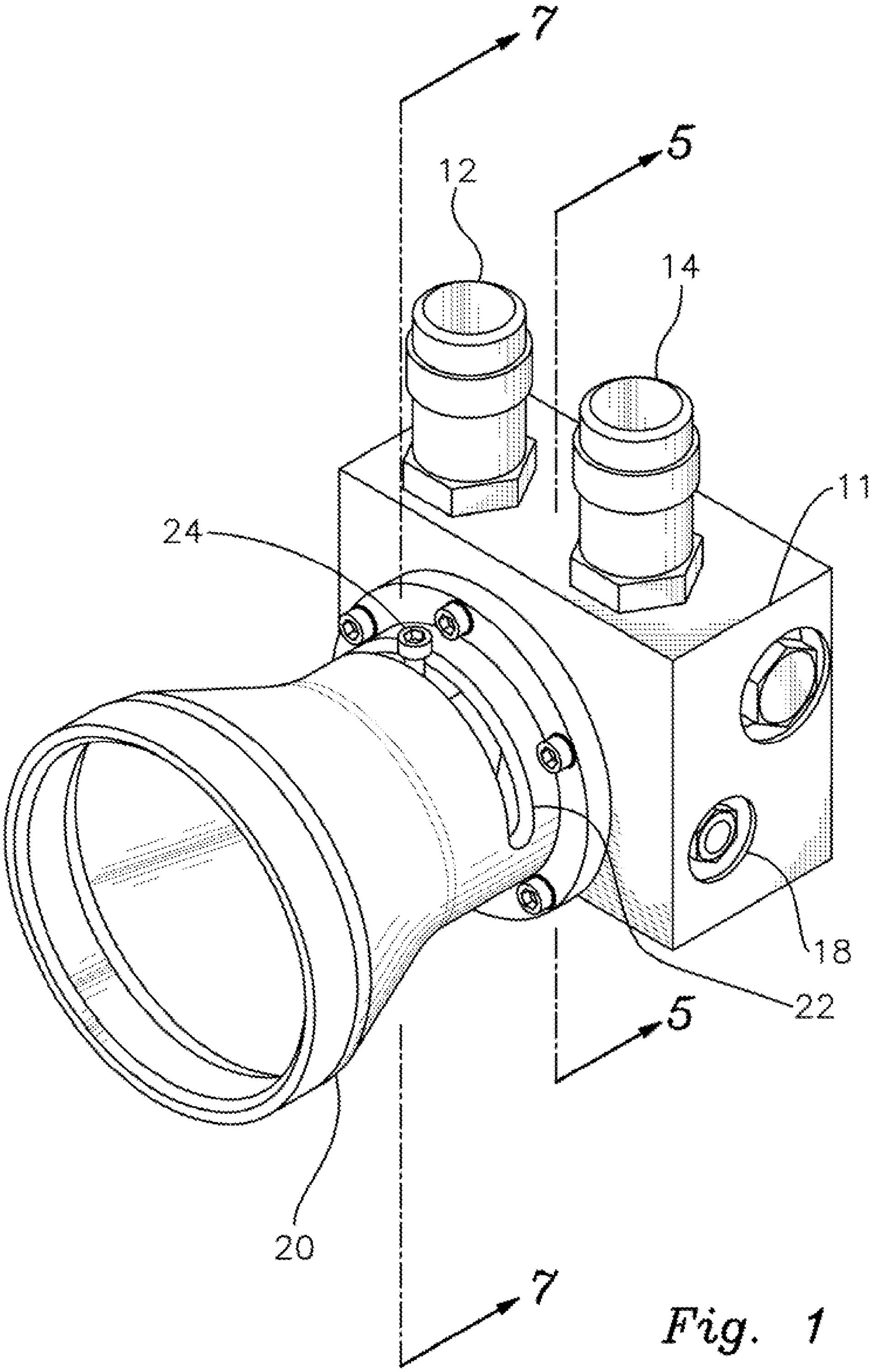
FIG. 1, a perspective view of a pilot regulator system according to a preferred embodiment of the invention.

Referring now to FIG. 1, a perspective view of pilot valve 10 is illustrated. Pilot valve 10 includes a housing component 11, from which extends a first regulator 12, a second regulator 14, a first ball valve output side with integral pressure equalization 16 (shown in FIG. 2), and a second ball valve output side with integral pressure equalization 18. Extension portion 20 extends from housing component 11 and is oriented in a position which is generally horizontal towards the orientation of first regulator 12 and second regulator 14.

Figure 2:
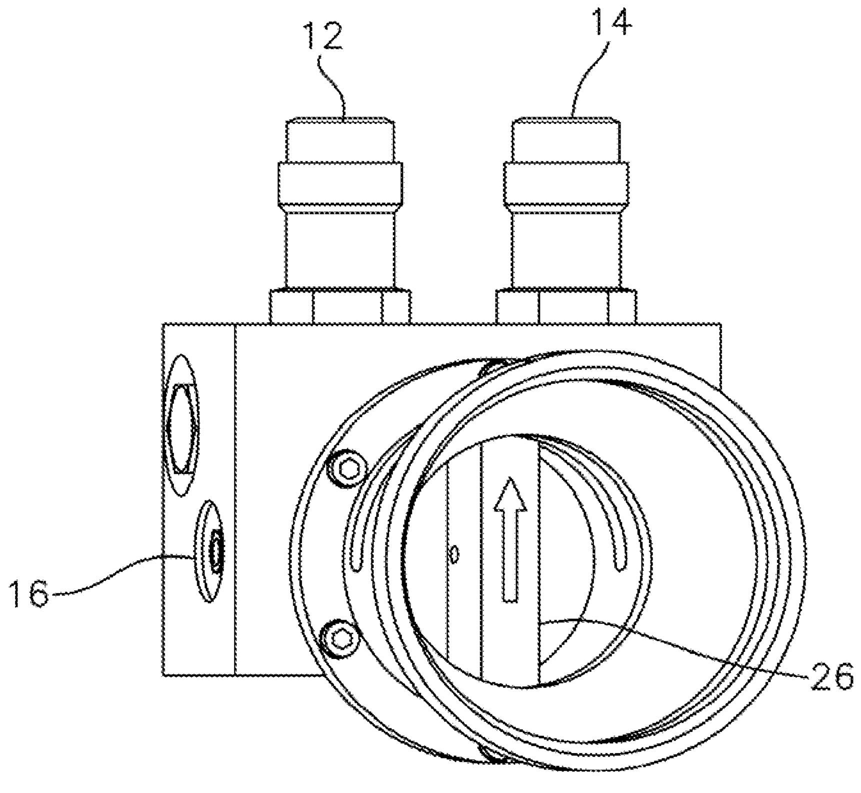
FIG. 2 shows another perspective view of the pilot regulator system of FIG. 1.

Extension portion 20 expands in diameter generally outward as it extends from housing component 11. Extension portion 20 is intended to protect components within extension portion 20 and act as a guide for a remotely operated vehicle (ROV) actuating tool. An elongated groove 22 extends near the base of extension portion 20 to approximately less than half the diameter of extension portion 20 along a portion which does not expand. A sub-member 24 protrudes through elongated groove 22 and couples to member 26, as shown in FIG. 2, encompassed within extension portion 20 to ensure that the ball valve is actuated to the correct orientation.

Figure 3:
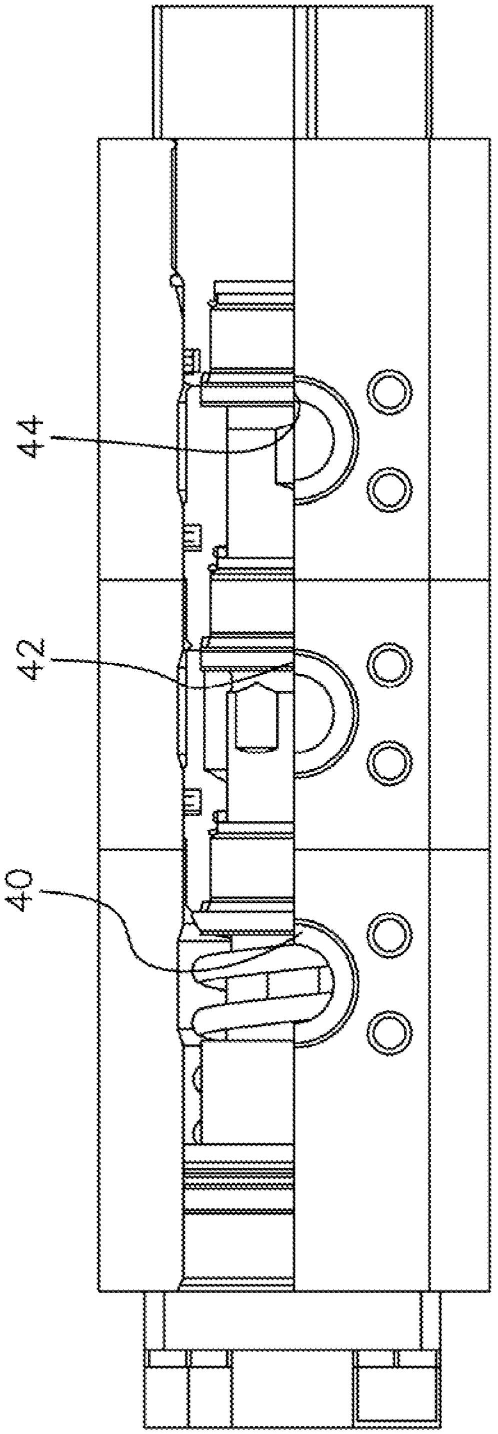
FIG. 3 shows a partial cutaway view of an assembly of an exemplary shuttle valve of a type that might be employed in connection with a pilot regulator of a preferred embodiment of the invention.

Member 26 is housed within the confines of extension portion 20 and is capable of rotation and thereby operating either ports and is associated with a shuttle valve as illustrated in FIG. 3 that may be employed in a three port system with three regulators. Member 26 communicates with portions of ball valve to direct flow to one of two regulators as shown in FIG. 1.

FIG. 3 shows by way of alternative illustration a three way shuttle valve that would operate in conjunction with three regulators and a three way ball valve to direct flow to the output of one of each regulator through the shuttle valve while at the same time closing off the other ports of the shuttle valve. For example, in FIG. 3 to open and close specified ports shown as ports 40, 42 and 44 a ball valve would direct flow to one of the associated regulators, which in turn would activate its associated shuttle valve port to permit output flow.

Flow diverted through particular ports of the shuttle valve encompassed within housing component 11, is received, disseminated, and/or distributed via first regulator 12 and second regulator 14, and if desired a third regulator, not shown. As member 26 is rotated to its fullest extent in one direction, flow communicating between first regulator 12 can be completely shut-off such that flow is only communicated between second regulator 14. Alternatively, as member 26 is rotated to its fullest extent in another direction, flow communicating between second regulator 14 can be completely cutoff such that flow may only be communicated between first regulator 12. As member 26 is rotated in various positions throughout the spectrum of its diameter, various inputs and outputs of pilot valve 10 can be opened and shutoff in order to allow various flow orientations to be regulated via shuttle valve 30.

As a result of the various rotations of member 26, the ports 40, 42, 44, shown in the cutout view of the shuttle valve illustrated in FIG. 3, are opened and closed by flow directed through the ball valve operated by member 26. It will be appreciated that the number of regulators and the associated number of inflow ports of the valve is not an important limitation of the present invention, though a minimum of two is required.

Figure 4:
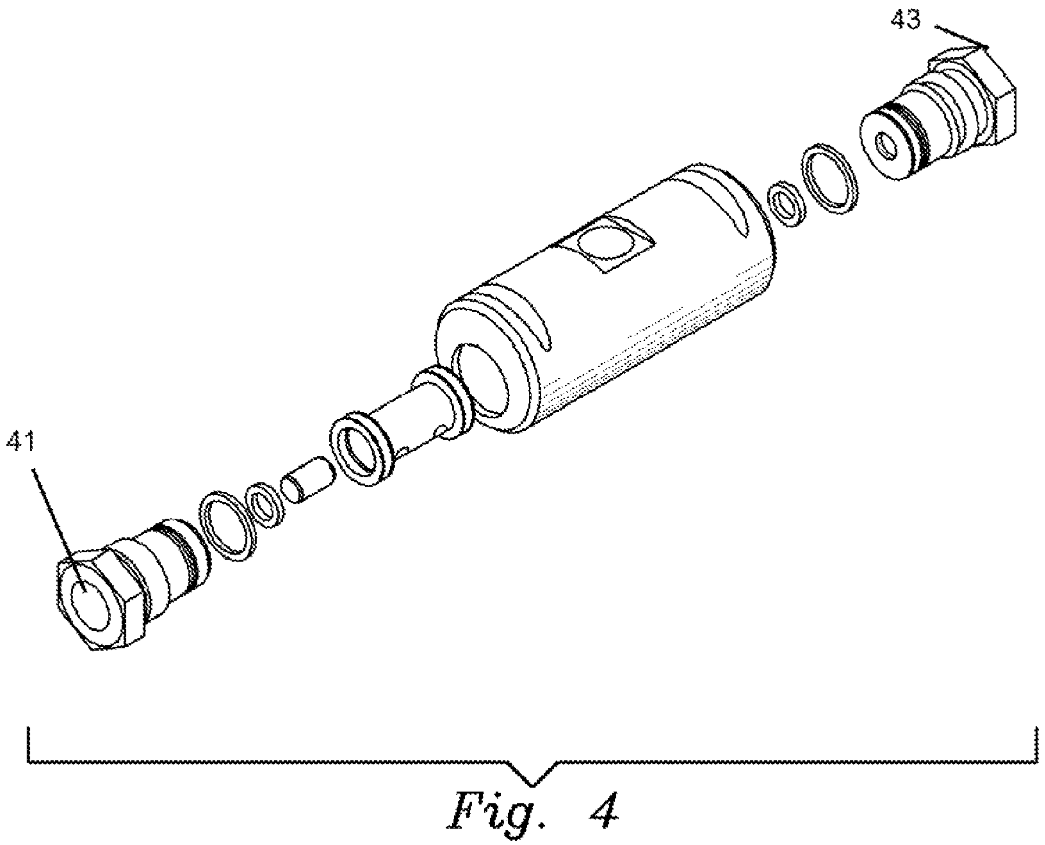
FIG. 4 shows an exploded assembly view of an alternate shuttle valve of a type that might be employed in connection with a pilot regulator of a preferred embodiment of is the invention.

Turning next to FIG. 4, there is shown an exploded perspective view of a two port shuttle valve that may be used in connection with the pilot regulator of the invention. FIG. 4 shows a two port shuttle valve having ports 41 and 43 controllable by the ROV through a control similar to member 26. Depending on which port is desired to be opened, member 26 is diverted and thereby directs flow to one side, closing the other side of the two sided shuttle valve.

Figure 5:
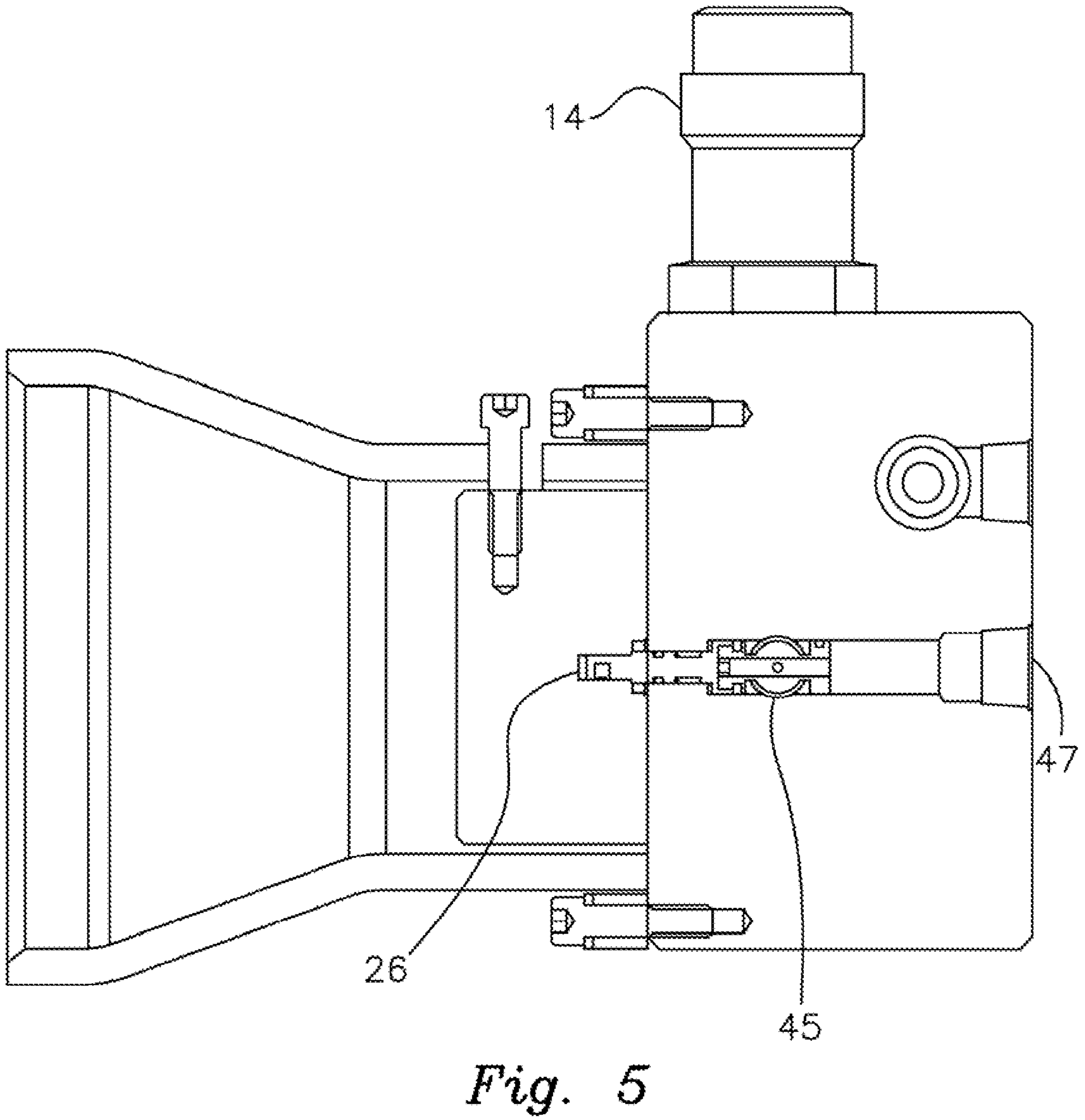
FIG. 5 shows a partial cutaway side cross sectional view of a pilot regulator taken along line 5-5 of FIG. 1.
Figure 6:
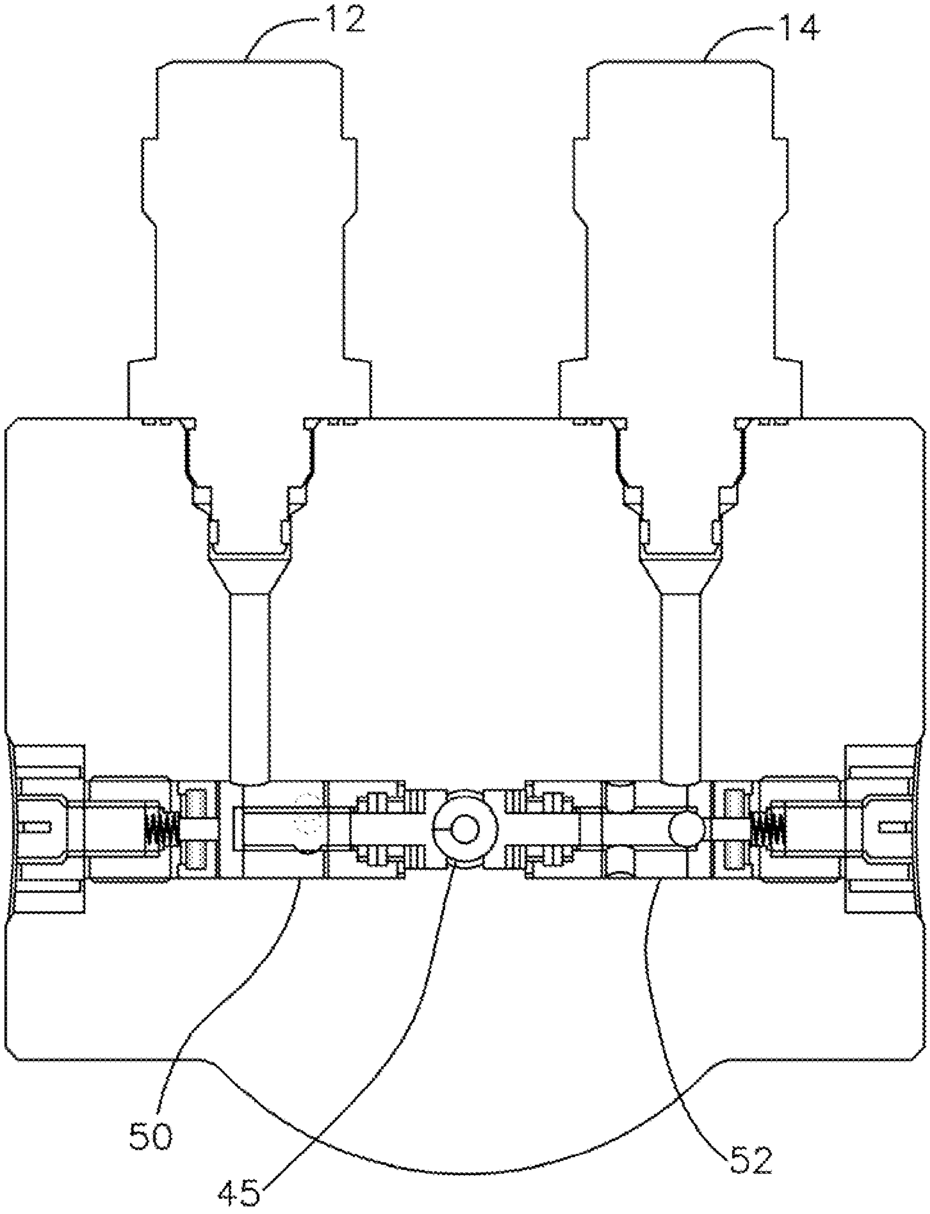
FIG. 6 shows a front elevational cross sectional view of a pilot regulator according to a preferred embodiment of the invention.

Turning next to FIG. 5, there is shown a cross sectional side view of a pilot regulator according to a preferred embodiment of the invention along line 5-5 of FIG. 1. Member 26 is operably engaged to ball valve 45 which may be positioned in at least one of two positions to control flow to the shuttle valve through a regulator such as regulator 14. Inlet 47 permits flow into ball valve 45 upon activation of member 26. As more readily seen in FIG. 6, which shows an elevational cross sectional view of a pilot regulator according to a preferred embodiment of the invention, ball valve 45 directs inlet flow to first section 50 or second section 52 depending on which regulator is intended to receive flow. As more fully shown in FIGS. 5 and 6, the ROV control operates ball valve 45 directly to either first regulator 12 or second regulator 14 which then regulates output fluid to the opposing sides of the shuttle valve sections to control flow as the ROV switch or member 26 is moved from one position to the other as described above. Depending on the position of member 26, the ball valve controls the input to the regulators and the shuttle valve automatically directs the fluid to the outlet and closes off the other regulator.

Figure 7:
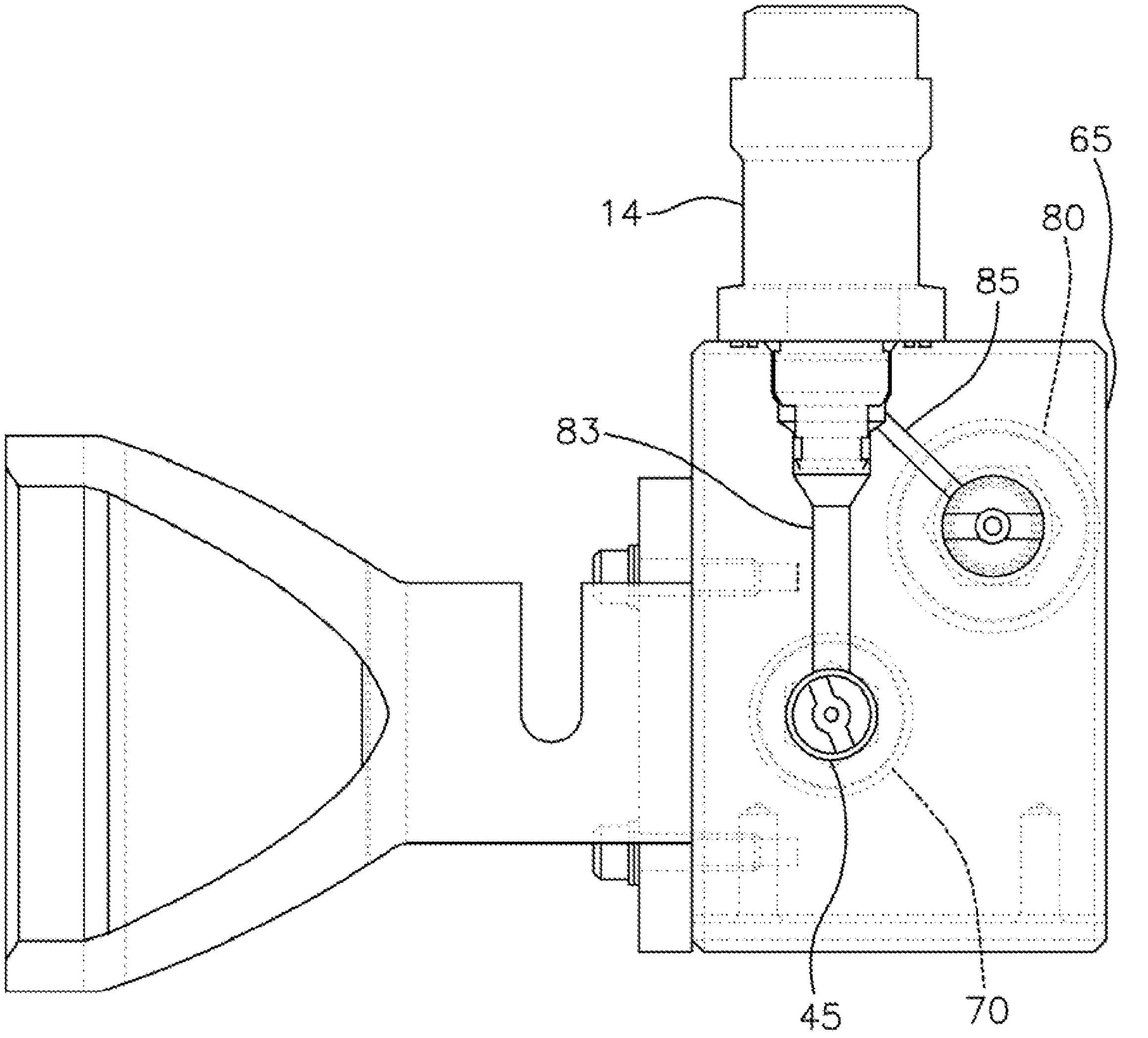
FIG. 7 is a partial cutaway side cross sectional view of a pilot regulator taken along line 7-7 of FIG. 1.

FIG. 7 shows another cross sectional view of the pilot regulator according to a preferred embodiment of the invention along line 7-7 of FIG. 1. This cross section is through a line that bisects second regulator 14 and shows the fluid connection 83 between ball valve 45 and the second regulator 14 and fluid connection 85 between the regulator and the shuttle valve 80. Depending on the rotation of member 26, the ball valve directs flow from the input 47 shown in FIG. 5, to one of the two regulators, in this figure, second regulator 14, which in turn causes fluid, after being regulated from a higher psi to a lower psi, into fluid connection 85 and out the shuttle valve 80 to outlet port 65.

All of the compositions and/or methods disclosed and claimed herein can be made and executed without undue experimentation in light of the present disclosure. While the compositions and methods of this invention have been described in terms of various embodiments, it will be apparent to those of skill in the art that other variations can be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

It will be understood that particular embodiments described herein are shown by way of illustration and not as limitations of the invention. The principal features of this invention can be employed in various embodiments without departing from the scope of the invention. All of the compositions and/or methods disclosed and claimed herein can be made and executed without undue experimentation in light of the present disclosure. Those skilled in the art will recognize, or be able to ascertain using no more than routine experimentation, numerous equivalents to the specific procedures described herein. Such equivalents are considered to be within the scope of this invention and are covered by the claims.

The invention claimed is:

1. A pilot regulator system comprising:

a housing having a fluid inflow port, a valve to regulate fluid flow to a fluid outflow port, two regulators each associated with one of two fluid outflow paths, and a regulator selection aperture;

an extension portion connected to said regulator selection aperture, said extension portion including an open end for access to a selection member that can be moved between two positions, said selection member operatively connected to said valve to select fluid flow to one of said two outflow paths;

said extension portion having a groove;

said selection member having an extension extending through said groove so as to be movable by said selection member; and said extension portion having an expansive cross-sectional element to guide a remote vehicle to said selection member for movement thereof.

2. A pilot regulator system as claimed in claim 1 wherein said valve is a ball valve,

3. A pilot regulator system as claimed in claim 1 wherein said extension is generally horizontal and orthogonal to the orientation of said plurality of regulator outputs.

4. A pilot regulator system as claimed in claim 1 wherein said groove is about half the circumference of the extension.

* * * * *